(12) United States Patent
Nakamura (10) Patent No.: US 10,780,540 B2
(45) Date of Patent: Sep. 22, 2020

(54) WORKPIECE CLAMP APPARATUS

(71) Applicant: Fanuc Corporation, Yamanashi (JP)

(72) Inventor: Ryouta Nakamura, Yamana (JP)

(73) Assignee: Fanuc Corporation, Yamanashi (JP)

( * ) Notice: Subject to any disclaimer, the term of this patent is extended or adjusted under 35 U.S.C. 154(b) by 18 days.

(21) Appl. No.: 15/596,324

(22) Filed: May 16, 2017

(65) Prior Publication Data

US 2017/0341196 A1 Nov. 30, 2017

(30) Foreign Application Priority Data

May 25, 2016 (JP) ................................. 2016-103934

(51) Int. Cl.
*B23Q 7/04* (2006.01)
*B23Q 3/08* (2006.01)
(Continued)

(52) U.S. Cl.
CPC ............... *B23Q 7/04* (2013.01); *B23Q 3/082* (2013.01); *B23Q 7/043* (2013.01); *B25J 9/20* (2013.01);
(Continued)

(58) Field of Classification Search
CPC .......... B23Q 7/04; B23Q 7/043; B23Q 3/082; B23Q 3/02; B23Q 3/06; B23Q 7/00–008;
(Continued)

(56) References Cited

U.S. PATENT DOCUMENTS 4,343,584 A * 8/1982 Hudgins ................ B65G 47/90
294/116
4,545,106 A * 10/1985 Juengel .................. G01B 7/003
29/563

(Continued)

FOREIGN PATENT DOCUMENTS

DE 102010003420 A1 10/2010
DE 102014114258 A1 8/2015
(Continued)

OTHER PUBLICATIONS

JP-H05-111845-A translation, Espacenet website (Year: 2018).*
(Continued)

*Primary Examiner* — Lee D Wilson
*Assistant Examiner* — Seahee Hong
(74) *Attorney, Agent, or Firm* — Shackelford, Bowen, McKinley & Norton, LLP (57) ABSTRACT

A workpiece clamp apparatus includes: a robot arm having, at a distal-end portion thereof, a holding section for holding a workpiece; a hydraulic-fluid supply coupler provided at the distal-end portion of the robot arm; a hydraulic-fluid supply device for supplying a hydraulic fluid to the hydraulic-fluid supply coupler; a clamping device having a plurality of clamping members that grip the workpiece for machining with a machine tool; and a cylinder that has a hydraulic-fluid supply port to which the hydraulic-fluid supply coupler can be connected and that drives the clamping member in the workpiece-gripping direction as a result (Continued)

of the hydraulic fluid being supplied via the hydraulic-fluid supply port.

3 Claims, 7 Drawing Sheets

(51) Int. Cl.
  *B25J 19/00* (2006.01)
  *B25J 9/20* (2006.01)
  *B25J 15/00* (2006.01)
(52) U.S. Cl.
  CPC ....... *B25J 15/0019* (2013.01); *B25J 19/0025* (2013.01); *Y10S 901/30* (2013.01); *Y10S 901/37* (2013.01)
(58) Field of Classification Search
  CPC ......... B23Q 7/048; B25J 9/20; B25J 15/0019; B25J 19/0025; B25J 15/00–0095; B25B 5/061; B25B 5/065; Y10S 901/30; Y10S 901/37
  USPC ........................................................ 700/245
  See application file for complete search history.

(56) References Cited

U.S. PATENT DOCUMENTS

| | | | | |
|---|---|---|---|---|
| 4,810,018 A | * | 3/1989 | van de Ven | B25J 15/0253 294/198 |
| 5,056,964 A | * | 10/1991 | Naka | B23B 39/003 29/41 |
| 5,822,847 A | * | 10/1998 | Arakawa | B25J 15/0206 29/741 |
| 6,644,331 B2 | | 11/2003 | Arisato | |
| 9,782,894 B2 | * | 10/2017 | Ryu | F15B 15/14 |
| 10,031,515 B2 | * | 7/2018 | Takahashi | G05B 19/41865 |
| 10,195,706 B2 | * | 2/2019 | Ogawa | B23Q 17/005 |
| 2002/0192067 A1 | * | 12/2002 | Prodel | B23P 19/007 414/799 |
| 2004/0094385 A1 | * | 5/2004 | Bybee | B25J 18/04 198/339.1 |
| 2006/0032564 A1 | * | 2/2006 | Weaver | B60C 23/0408 152/152.1 |
| 2008/0122152 A1 | * | 5/2008 | Halford | B23Q 5/40 269/37 |
| 2010/0251863 A1 | | 10/2010 | Sakai et al. | |
| 2016/0046019 A1 | | 2/2016 | Ryu et al. | |
| 2017/0050282 A1 | | 2/2017 | Kruck | |
| 2017/0326701 A1 | | 11/2017 | Morimura | |
| 2018/0141174 A1 | | 5/2018 | Mori et al. | |
| 2020/0016710 A1 | * | 1/2020 | Yoshimura | B23Q 3/082 |

FOREIGN PATENT DOCUMENTS

| | | | | |
|---|---|---|---|---|
| DE | 102017110029 A1 | | 11/2017 | |
| DE | 112016002368 T5 | | 2/2018 | |
| GB | 1426574 A | * | 3/1976 | ............ B23Q 3/082 |
| JP | S60-67042 A | | 4/1985 | |
| JP | S63-147237 U | | 9/1988 | |
| JP | H02-85546 U | * | 7/1990 | |
| JP | H03-47975 B | * | 7/1991 | |
| JP | H05-111845 A | * | 5/1993 | |
| JP | H05-111845-A 05 | * | 5/1993 | |
| JP | H05-111845-A 05 | * | 7/1993 | |
| JP | H10328965 A | | 12/1998 | |
| JP | 2001-322049 A | | 11/2001 | |

OTHER PUBLICATIONS

JP-H02-85546-U translation, machine generated from applicant (Year: 2018).*
JP-H03-47975-B translation, JPO and INPIT from applicant (Year: 2018).*
Japan Patent Office, Office Action dated May 22, 2018 for Japan Patent Application No. 2016-103934.
Tsuda, Kenji; Decision to Grant a Patent; Japanese Patent Application No. 2016-103934; dated Jan. 29, 2019; 3 pages.

* cited by examiner

WORKPIECE CLAMP APPARATUS

CROSS-REFERENCE TO RELATED APPLICATIONS

This application is based on and claims priority to Japanese Patent Application No. 2016-103934 filed on May 25, 2016, the content of which is incorporated herein by reference.

TECHNICAL FIELD

The present invention relates to workpiece clamp apparatus and more specifically to a workpiece clamp apparatus for clamping a workpiece to be machined with a machine tool.

BACKGROUND ART

As an example of this type of known workpiece clamp apparatus for a machine tool, there is a known workpiece clamp apparatus including: a plurality of clamp palettes each having a plurality of clamping members that grip a workpiece; a cylinder provided on each of the clamped palettes and drives, in the workpiece-gripping direction, at least one of the plurality of clamping members; a set-up device provided outside the machining chamber of the machine tool; and a hydraulic-fluid supply section provided on the set-up device, wherein when a clamped palette is connected to the set-up device, the cylinder of the clamped palette is connected to the hydraulic-fluid supply section of the set-up device, thereby allowing the clamping members to grip or release the workpiece (refer to, for example, Patent Literature 1).

CITATION LIST

Patent Literature

{PTL 1}
Japanese Unexamined Patent Application, Publication No. H10-328965

SUMMARY OF INVENTION

A workpiece clamp apparatus according to one aspect of the present invention includes: a robot arm having a workpiece holding section for holding a workpiece at a distal-end portion thereof; a hydraulic-fluid supply coupler provided at the distal-end portion of the robot arm; a hydraulic-fluid supply device which supplies a hydraulic fluid to the hydraulic-fluid supply coupler; a clamping device having a plurality of clamping members that grip the workpiece for machining with a machine tool; and a cylinder that is provided on the clamping device, that has a hydraulic-fluid supply port to which the hydraulic-fluid supply coupler can be connected, and that drives at least one of the plurality of clamping members in a workpiece-gripping direction as a result of the hydraulic fluid being supplied via the hydraulic-fluid supply port, wherein the robot arm is configured to connect the hydraulic-fluid supply coupler to the hydraulic-fluid supply port, and the hydraulic-fluid supply port is configured such that the hydraulic fluid does not flow out of the cylinder in a state where the hydraulic-fluid supply coupler is not connected.

DESCRIPTION OF EMBODIMENTS

A workpiece clamp apparatus according to a first embodiment of the present invention will now be described with reference to the drawings.

Figure 1:
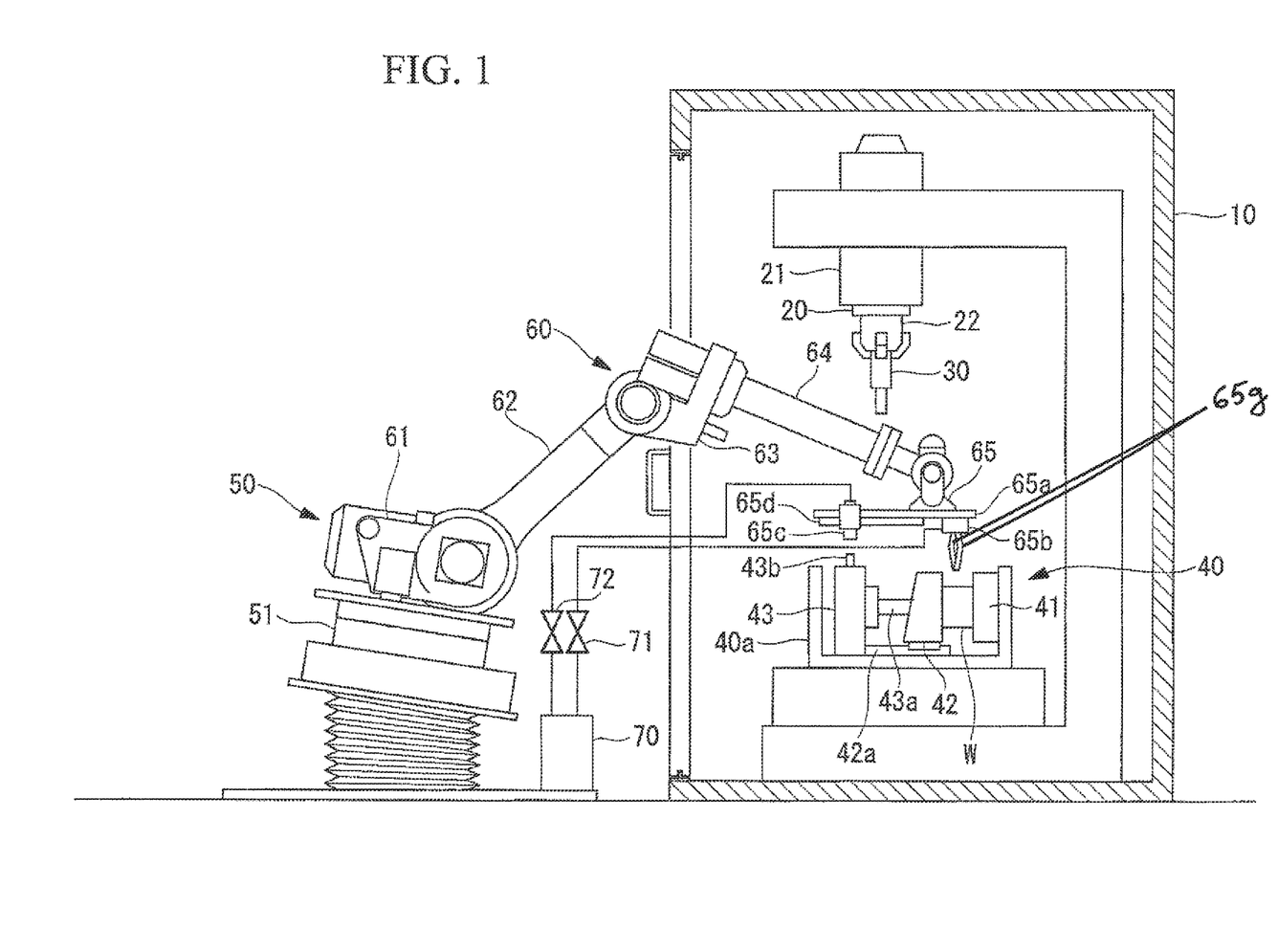
FIG. 1 is a schematic configuration diagram of a workpiece clamp apparatus according to a first embodiment of the present invention.

As shown in FIG. 1, this workpiece clamp apparatus is used in a machining system having a machine tool that rotates a main shaft 20 supported on a frame 10 to carry out the machining of a workpiece W with a tool mounted on the main shaft 20. The main shaft 20 of this machine tool is supported on the frame 10 via a main-shaft support section 21, and this main shaft 20 not only moves in the vertical direction but also rotates by means of a known machine tool structure.

In addition, a clamping device 40 on which the workpiece W is placed and held and the main shaft 20 may move relatively to each other in the horizontal direction by means of a known machine tool structure. For example, the clamping device 40 may be configured so as to move along the X-axis in the horizontal direction with a servomotor and a linear motion screw and may also move along the Y-axis in the horizontal direction with another servomotor and another linear motion screw.

In this machine tool, a tool 30, such as an end mill, a milling cutter including a face milling cutter, or a drill, is mounted on the main shaft 20 via a tool holder 22.

This machining system further includes a robot 50 having a robot arm 60 for moving an unmachined workpiece W from an unmachined-workpiece storage space to the clamping device 40 and for moving a machined workpiece W from the clamping device 40 to a machined-workpiece storage space.

The robot 50 is provided with a base 51 that tilts in the horizontal direction (left/right direction and depth direction in FIG. 1).

The robot arm 60 includes: a base section 61 supported on the base 51 so as to be capable of rotating about an axis extending in the vertical direction; a basal-end-side arm 62 supported on the base section 61 so as to be capable of rotating about an axis in a substantially horizontal direction; an intermediate section 63 supported on the distal end of the basal-end-side arm 62 so as to be capable of rotating about an axis in a substantially horizontal direction; a distal-end-side arm 64 supported on the intermediate section 63; and a distal-end portion 65 supported on the distal-end portion of the distal-end-side arm 64 so as to be capable of rotating about an axis in a substantially horizontal direction. The distal-end side of the distal-end-side arm 64 is configured to rotate about the central axis thereof. The distal-end portion 65 may be configured to rotate relatively to the distal-end-side arm 64 about an axis extending in the vertical direction.

The distal-end portion 65 includes a distal-end-portion base 65*a* extending in the horizontal direction, and a holding section 65*b* for holding the workpiece W is provided on the undersurface at one end in the longitudinal direction of the distal-end-portion base 65*a*. Furthermore, in the vicinity of one edge in the width direction at another end in the longitudinal direction of the distal-end-portion base 65*a*, a hydraulic-fluid supply coupler 65*c* is mounted via a known linear guide 65*d* serving as coupler-position changing means. The linear guide 65*d* is fixed to the distal-end-portion base 65*a* and has, for example: a rail that extends in the above-described longitudinal direction and on which the hydraulic-fluid supply coupler 65*c* is movably mounted; and a motor and a ball screw for driving the hydraulic-fluid supply coupler 65*c* along the rail.

The holding section 65*b* and the hydraulic-fluid supply coupler 65*c* are each connected to a hydraulic-fluid supply device 70, such as a compressor. More specifically, the holding section 65*b* is connected to the hydraulic-fluid supply device 70 via a first valve 71, and the hydraulic-fluid supply coupler 65*c* is connected to the hydraulic-fluid supply device 70 via a second valve 72.

The holding section 65*b* has a plurality of holding claws 65*g*, and when the first valve 71 is opened and a hydraulic fluid is supplied from the hydraulic-fluid supply device 70 to the holding section 65*b*, the plurality of holding claws 65*g* are driven in the workpiece-gripping direction. Furthermore, the holding section 65*b* includes a biasing member such as a spring, for urging the plurality of holding claws 65*g* in the direction opposite to the workpiece-gripping direction, and when the first valve 71 is closed, the plurality of holding claws 65*g* move in the direction opposite to the workpiece-gripping direction.

The robot 50 and the robot arm 60 include a servomotor 51*a* for tilting the base 51, a servomotor 61*a* for rotating the base section 61, a servomotor 62*a* for rotating the basal-end-side arm 62, a servomotor 63*a* for rotating the intermediate section 63, a servomotor 64*a* for rotating the distal-end side of the distal-end-side arm 64, and a servomotor 65*e* for rotating the distal-end portion 65.

The clamping device 40 includes: a clamping-device main body 40*a*; a first clamping member 41 fixed to the clamping-device main body 40*a*; a second clamping member 42 that is disposed so as to face the first clamping member 41 and that is guided along a rail 42*a*; and a cylinder 43, fixed to the clamping-device main body 40*a*, the operating rod 43*a* of which is fixed to the second clamping member 42, that makes the second clamping member 42 move in the direction (workpiece-gripping direction) towards the first clamping member. The cylinder 43 is provided with a hydraulic-fluid supply port 43*b*, which is a coupler as the companion part of the hydraulic-fluid supply coupler 65*c*. The clamping device 40 is configured such that the second clamping member 42 is moved by the cylinder 43 in the workpiece-gripping direction when a hydraulic fluid is supplied via the hydraulic-fluid supply port 43*b* into the cylinder 43, and such that the second clamping member 42 is moved in the direction opposite to the workpiece-gripping direction by a biasing member (not shown in the figure), such as a spring, provided on the clamping device 40 when the hydraulic fluid in the cylinder 43 is discharged via the hydraulic-fluid supply port 43*b*.

Figure 2:
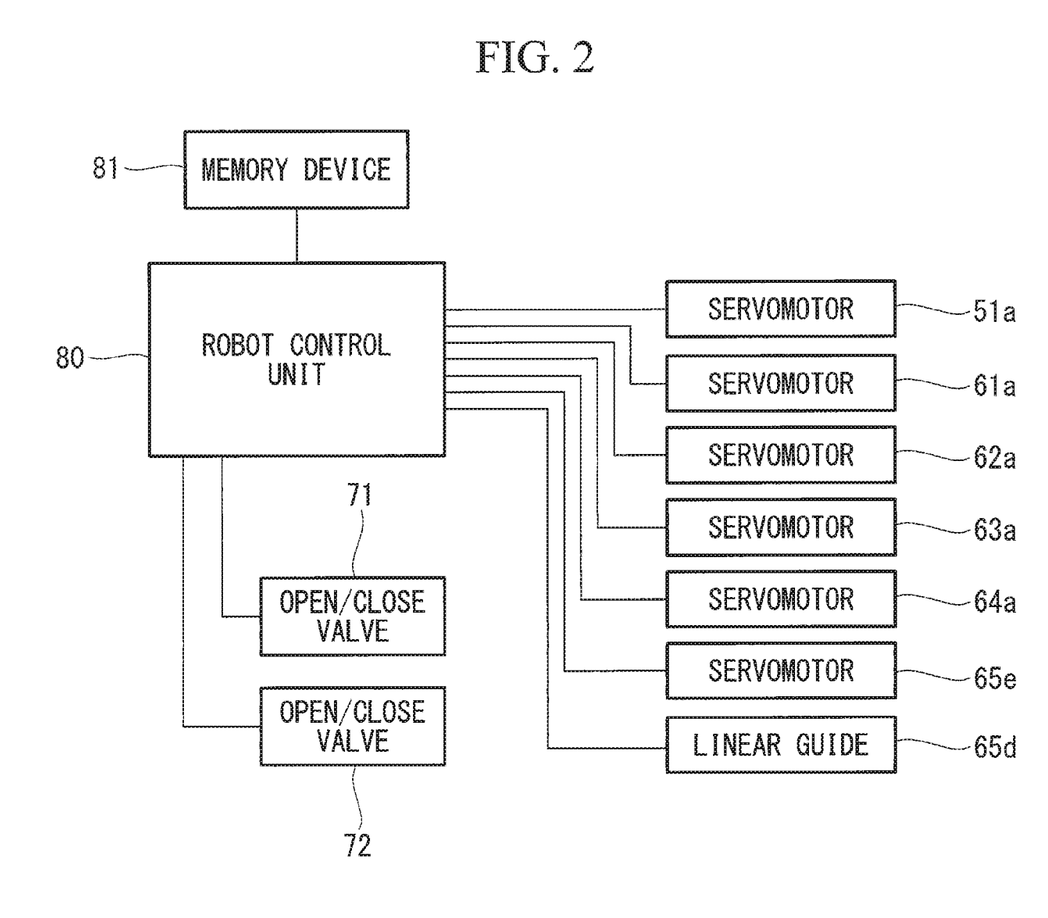
FIG. 2 is a schematic block diagram of the workpiece clamp apparatus of the first embodiment.

As shown in FIG. 2, each of the servomotors 51*a*, 61*a*, 62*a*, 63*a*, 64*a*, and 65*e* of the robot 50, each of the valves 71 and 72 of the hydraulic-fluid supply device 70, and the linear guide 65*d* are connected to a robot control unit 80 and are controlled by the robot control unit 80.

The robot control unit 80 is operated with a workpiece-exchange program stored in a memory device 81 and controls each of the servomotors 51*a*, 61*a*, 62*a*, 63*a*, 64*a*, and 65*e* and each of the valves 71 and 72 to move the unmachined workpiece W from the unmachined-workpiece storage space to the clamping device 40 with the robot arm 60 and also move the machined workpiece W from the clamping device 40 to the machined-workpiece storage space. One example of the operation of the robot control unit 80 when the unmachined workpiece W is moved from the unmachined-workpiece storage space to the clamping device 40 by using the robot arm 60 will be described below with reference to the flowchart in FIG. 3.

Figure 3:
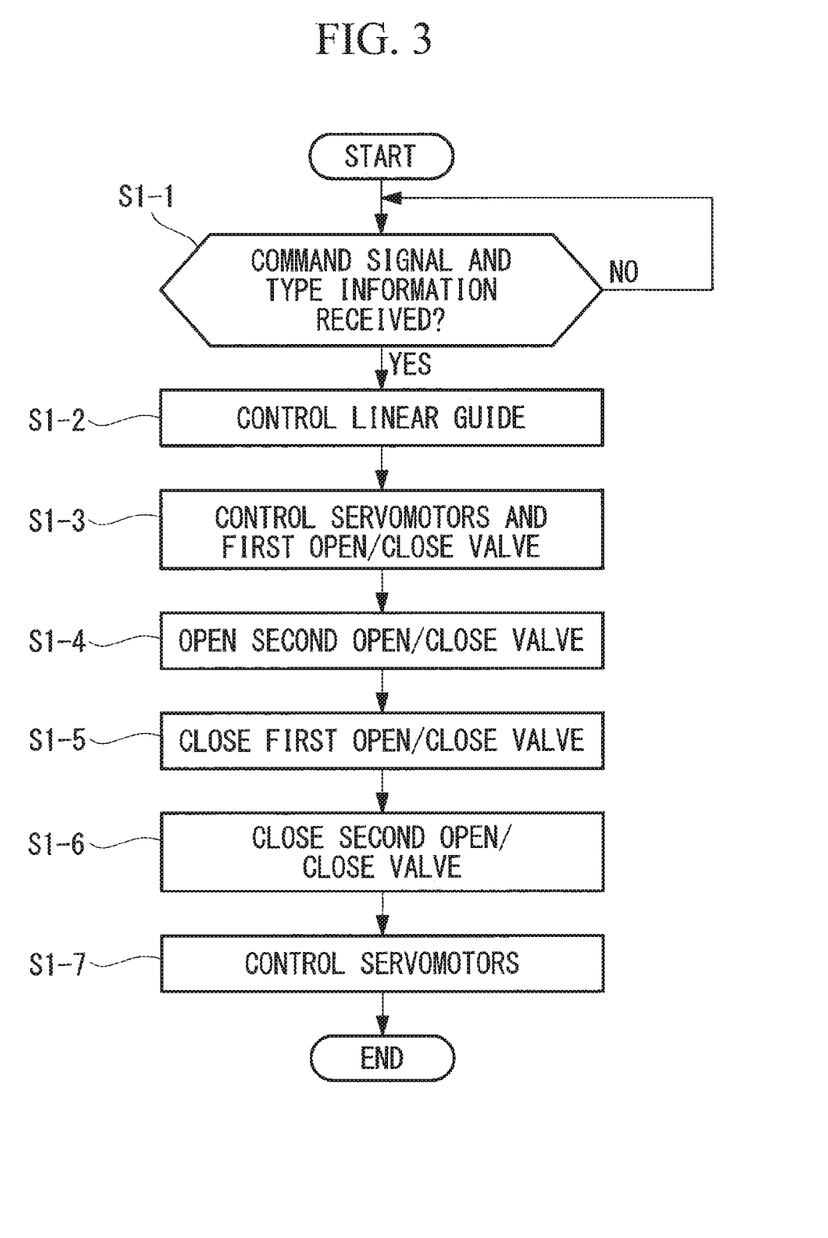
FIG. 3 is a flowchart illustrating an example of operation of a robot control unit of the first embodiment.

When the robot control unit 80 receives a command signal for workpiece supply and type information of the clamping device 40 from, for example, the machine tool or the like (step S1-1), it controls the linear guide 65*d* so as to arrange the hydraulic-fluid supply coupler 65*c* at a position corresponding to the type information (step S1-2). The type information of the clamping device 40 may be received when an operator inputs the type information via a predetermined input device, rather than together with a command signal of workpiece supply.

When the processing in step S1-2 is performed, the robot control unit 80 refers to the coupler-position information stored in the memory device 81. The coupler-position information includes information indicating association between the type of the clamping device 40 and the arrangement position of the hydraulic-fluid supply coupler 65*c*, and hence, the robot control unit 80 can acquire information on the position at which the hydraulic-fluid supply coupler 65*c* should be arranged by referring to this coupler-position information.

Figure 5:
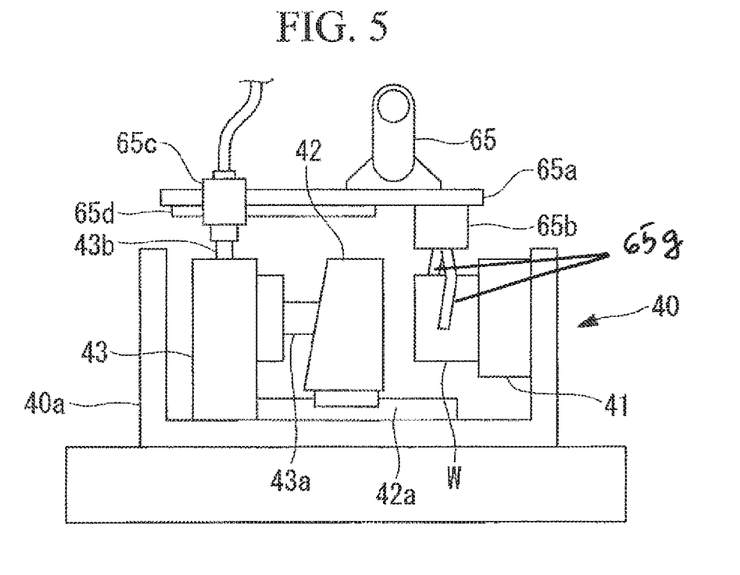
FIG. 5 is a diagram depicting an operation of a clamping device of the first embodiment.

Subsequently, the robot control unit 80 controls each of the servomotors 51*a*, 61*a*, 62*a*, 63*a*, 64*a*, and 65*e* and the first valve 71 so as to move the unmachined workpiece W from the unmachined-workpiece storage space to the position at which the workpiece can be gripped with the first clamping member 41 and the second clamping member 42 of the clamping device 40 (step S1-3). As shown in FIG. 5, in step S1-2, when the workpiece W held by the plurality of holding claws 65*g* of the holding section 65*b* is disposed at the position at which the workpiece W can be gripped with the first clamping member 41 and the second clamping member 42, the hydraulic-fluid supply coupler 65*c* is arranged so that the hydraulic-fluid supply coupler 65*c* is connected to the hydraulic-fluid supply port 43*b* of the clamping device 40.

The hydraulic-fluid supply port 43*b* has a valve structure that becomes an open state when the hydraulic-fluid supply coupler 65*c* is connected and that becomes a closed state when the hydraulic-fluid supply coupler 65*c* is not connected. This valve structure includes, for example: a valve element, such as a metal sphere, provided in a fluid flow channel of the hydraulic-fluid supply port 43*b*; a bearing surface that is provided in the fluid flow channel and that closes the fluid flow channel when the valve element abuts therewith; and a biasing member, such as a spring, for urging the valve element towards the bearing surface. Then, as a result of being pushed by a part of the hydraulic-fluid supply coupler 65*c* when the hydraulic-fluid supply coupler 65*c* is connected to the hydraulic-fluid supply port 43*b*, the valve element moves in a direction away from the bearing surface against the biasing member, thereby causing the valve structure to become an open state.

Figure 6:
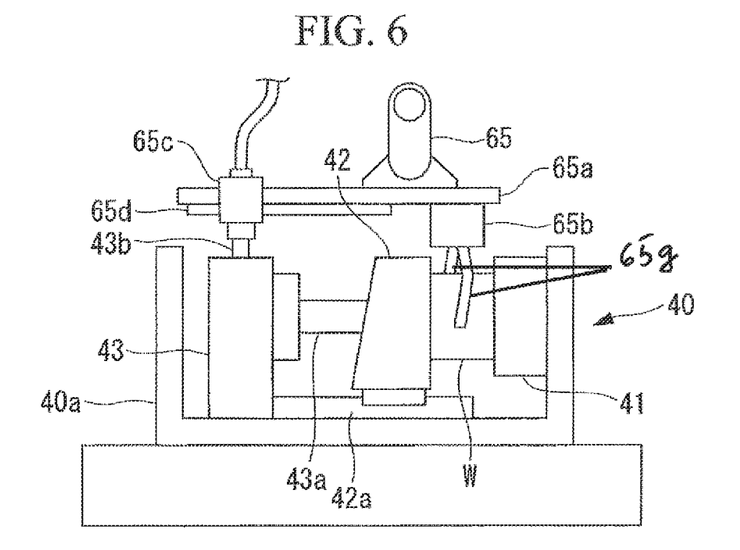
FIG. 6 is a diagram depicting an operation of the clamping device of the first embodiment.

Subsequently, as shown in FIG. 6, the robot control unit 80 controls the second valve 72 to become an open state so that the second clamping member 42 moves towards the first clamping member 41 side to allow the workpiece W to be gripped with the clamping members 41 and 42 (step S1-4). Then, when the workpiece W is gripped with the clamping members 41 and 42, the first valve 71 is controlled to become a closed state (step S1-5). By doing so, the holding of the workpiece W by the plurality of holding claws 65g of the holding section 65b is released.

Next, the second open/close valve 72 is controlled to become a closed state (step S1-6), and each of the servomotors 51a, 61a, 62a, 63a, 64a, and 65e is controlled so that the holding section 65b and the hydraulic-fluid supply coupler 65c are arranged at predetermined standby positions outside the machine tool (step S1-7). By doing so, the workpiece W gripped with the clamping device 40 can be machined with the machine tool.

Figure 4:
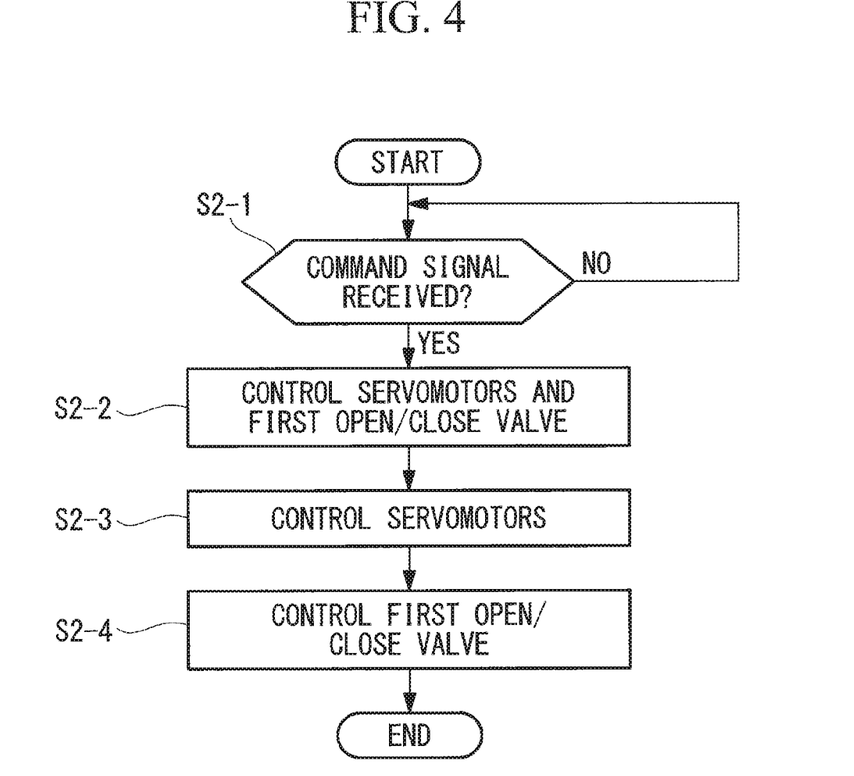
FIG. 4 is a flowchart illustrating an example of operation of the robot control unit of the first embodiment.

On the other hand, one example of the operation of the robot control unit 80 when the machined workpiece W is moved from the clamping device 40 to the machined-workpiece storage space with the robot arm 60 will be described below with reference to the flowchart in FIG. 4.

When the robot control unit 80 receives a command signal for the collection of a workpiece from, for example, the machine tool or the like (step S2-1), the workpiece W is held with the plurality of holding claws 65 g of the holding section 65b, as shown in FIG. 6, and the servomotors 51a, 61a, 62a, 63a, 64a, and 65e and the first valve 71 are each controlled so that the hydraulic-fluid supply coupler 65c is connected to the hydraulic-fluid supply port 43b of the clamping device 40 (step S2-2).

When the hydraulic-fluid supply coupler 65c is connected to the hydraulic-fluid supply port 43b, the valve structure of the hydraulic-fluid supply port 43b becomes an open state in step S2-2. At this time, a hydraulic fluid is supplied into the cylinder 43 when the hydraulic fluid is supplied via the hydraulic-fluid supply coupler 65c. However, when no hydraulic fluid is supplied via the hydraulic-fluid supply coupler 65c, the hydraulic fluid in the cylinder 43 is configured to be discharged. Because of this, the second clamping member 42 moves in the direction opposite to the workpiece-gripping direction by the biasing member provided in the clamping device 40.

Subsequently, the robot control unit 80 controls each of the servomotors 51a, 61a, 62a, 63a, 64a, and 65e so that the machined workpiece W is moved from the clamping device 40 to the position above the machined-workpiece storage space (step S2-3) and thereafter, controls the first valve 71 so that the holding of the workpiece W by the holding section 65b is released (step S2-4). As a result, the machined workpiece W is extracted from the machine tool.

According to the this embodiment, in order to grip the workpiece W by driving the second clamping member 42, it is configured to connect the hydraulic-fluid supply coupler 65c provided at the distal-end portion 65 of the robot arm 60 to the hydraulic-fluid supply port 43b of the cylinder 43 that drives the second clamping member 42, and hence the workpiece W can be gripped with the second clamping member 42 in the operation range of the distal-end portion of the robot arm 60. For this reason, this embodiment is not subject to a constraint in that the clamping device 40 needs to be moved to a predetermined position in order to grip the workpiece W, and also no need to provide a dedicated device for gripping the workpiece W with the clamping device 40.

Furthermore, in this embodiment, when the workpiece W held with the holding section 65b is disposed by the robot arm 60 at a position where the workpiece W can be gripped with the clamping members 41 and 42, the hydraulic-fluid supply coupler 65c is connected to the hydraulic-fluid supply port 43b. Therefore, a step of disposing the workpiece W held with the holding section 65b at a position where the workpiece W can be gripped with the clamping members 41 and 42 and a step of gripping the workpiece W with the clamping members 41 and 42 can be executed at the same time or substantially at the same time, thus advantageous in shortening the cycle time for machining.

Furthermore, this embodiment includes the linear guide 65d for changing the position of the hydraulic-fluid supply coupler 65c relative to the distal-end portion 65 of the robot arm 60. Therefore, a step of disposing the workpiece W held with the holding section 65b at a position where the workpiece W can be gripped with the clamping members 41 and 42 and a step of gripping the workpiece W with the clamping members 41 and 42 can be executed at the same time or substantially at the same time for a plurality of types of clamping devices 40 having different distances between the position at which the workpiece W is gripped with the clamping members 41 and 42 and the hydraulic-fluid supply port 43b.

Figure 7:
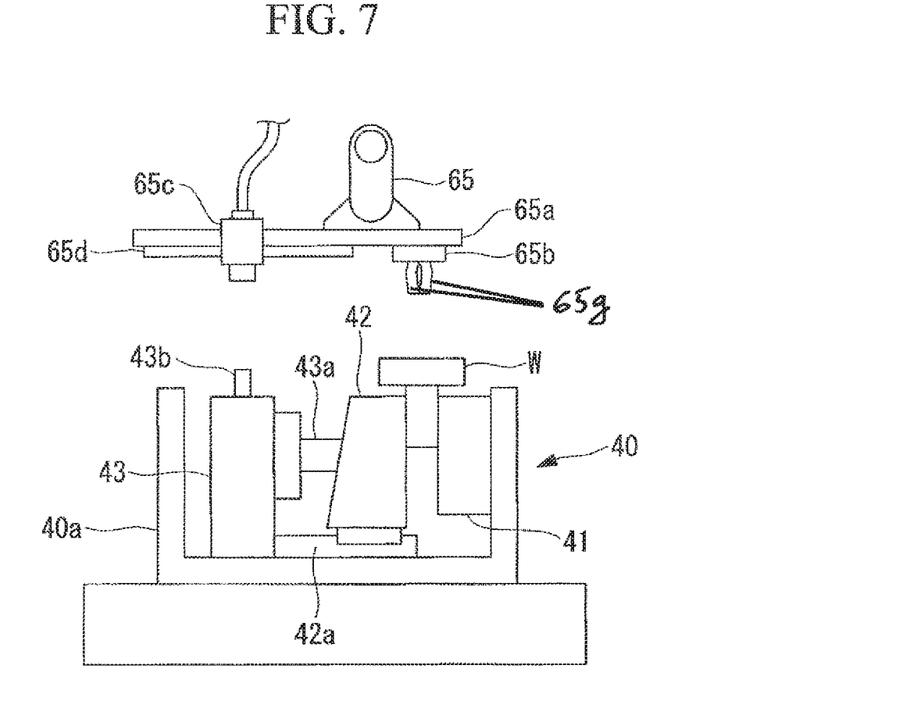
FIG. 7 is a front view of the clamping device, showing a modification of the first embodiment.

For example, as shown in FIG. 7, when the distance between the first clamping member 41 and the hydraulic-fluid supply port 43b is shorter than in the case of the clamping device 40 shown in, for example, FIG. 5, the hydraulic-fluid supply coupler 65c is moved towards the holding section 65b side by using the linear guide 65d.

In addition, this embodiment allows a hydraulic fluid to be supplied to the hydraulic-fluid supply coupler 65c and to the holding section 65b by using a single hydraulic-fluid supply device 70, thereby advantageous in suppressing an increase in the number of constituent components.

It should be noted that, in this embodiment, the holding section 65b may be configured to hold an iron workpiece W with a magnetic force.

Furthermore, in this embodiment, the hydraulic-fluid supply coupler 65c is connected to the hydraulic-fluid supply port 43b at the same time the workpiece W is disposed by the holding section 65b between the first and second clamping members 41 and 42. Alternatively, the robot arm 60 may be moved to connect the hydraulic-fluid supply coupler 65c to the hydraulic-fluid supply port 43b after the workpiece W has been disposed by the holding section 65b between the first and second clamping members 41 and 42. Also in this case, there is no constraint in that the clamping device 40 needs to be moved to a predetermined position in order to grip the workpiece W, nor does a dedicated device for gripping the workpiece W with the clamping device 40 need to be provided.

Figure 8:
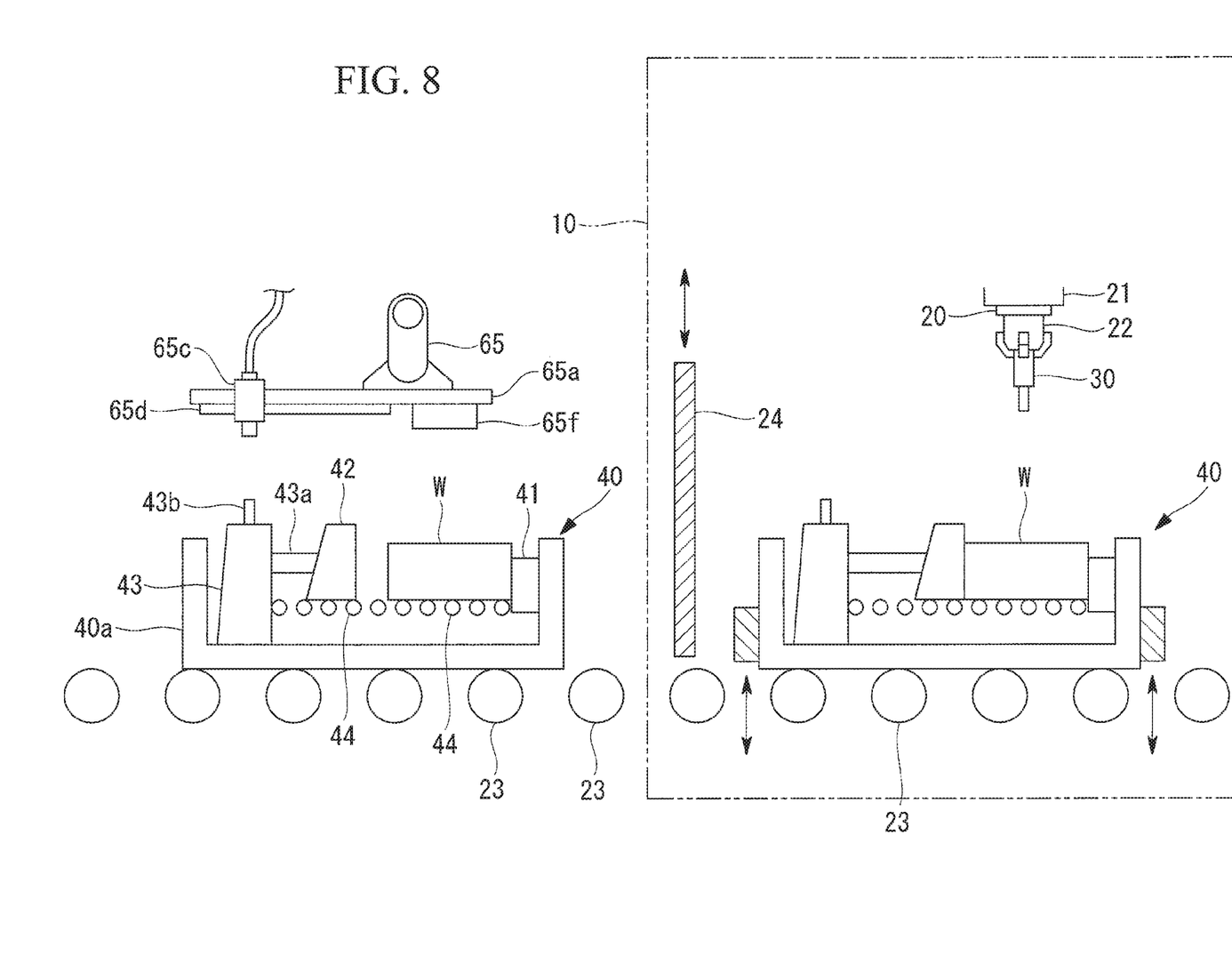
FIG. 8 is a schematic configuration diagram of a workpiece clamp apparatus according to a second embodiment of the present invention.

A workpiece-clamping apparatus according to a second embodiment of the present invention will now be described with reference to FIG. 8.

In this embodiment, unlike in the first embodiment, the clamping device 40 is not fixed to the machine tool. Furthermore, the second embodiment differs from the first embodiment in that: a plurality of clamping devices 40 are provided; a plurality of rollers 44 for assisting in the movement of the workpiece W are provided on each of the clamping devices 40; a holding section 65f for holding the iron workpiece W with a magnetic force, instead of the holding section 65b, and a magnetic-force adjusting section for adjusting the magnetic force of the holding section 65f are provided so that the holding of the workpiece W by the holding section 65f is released as a result of the robot control unit 80 controlling the magnetic-force adjusting section; and the plurality of clamping devices 40 are disposed sequentially at the position where the workpiece W is machined with the machine tool by using a known palette changing mechanism. The robot control unit 80 controls a magnetic-force control unit, instead of the first valve 71, in the same manner as in the first embodiment. The same structures as those in the first embodiment are denoted with the same reference signs, and descriptions thereof will be omitted.

In this embodiment, a plurality of rollers 23 for moving each of the clamping devices 40 to the machine tool and a motor, not shown in the figure, for driving each of the rollers 23 are provided as the palette changing mechanism. By doing so, the plurality of clamping devices 40 are arranged sequentially at the position where the workpiece W is machined with the machine tool. Furthermore, the machine tool of this embodiment is also provided with a shutter 24 that separates the inside of the frame 10 from the outside and that is movable in the vertical direction.

Each of the rollers 44 of each of the clamping devices 40 is a metal sphere and is rotatably supported on the clamping device 40.

In this embodiment, unlike in the first embodiment, the workpiece W is gripped with a clamping device 40 that is disposed on the outside the machine tool with respect to the shutter 24, for example, the clamping device 40 that is to be moved for the next machining, to the position where the workpiece W is machined with the machine tool. Although the location of each of the clamping devices 40 when the workpiece W is gripped differs from that in the first embodiment, the operation of the robot arm 60, the holding section 65b, the second valve 72, and so forth for allowing the clamping device 40 to grip the workpiece W is the same as in the first embodiment.

With this configuration, the cycle time for machining can be shortened, compared with a case where the clamping device 40 is made to grip the workpiece W at the position where the workpiece W is machined with the machine tool.

From the above-described embodiments, the following aspects of the present invention are derived.

A workpiece clamp apparatus according to an aspect of the present invention includes: a robot arm having a workpiece holding section for holding a workpiece at a distal-end portion thereof; a hydraulic-fluid supply coupler provided at the distal-end portion of the robot arm; a hydraulic-fluid supply means which supplies a hydraulic fluid to the hydraulic-fluid supply coupler; a clamping device having a plurality of clamping members that grip the workpiece for machining with a machine tool; and a cylinder that is provided on the clamping device, that has a hydraulic-fluid supply port to which the hydraulic-fluid supply coupler can be connected, and that drives at least one of the plurality of clamping members in a workpiece-gripping direction as a result of the hydraulic fluid being supplied via the hydraulic-fluid supply port, wherein the robot arm is configured to connect the hydraulic-fluid supply coupler to the hydraulic-fluid supply port, and the hydraulic-fluid supply port is configured such that the hydraulic fluid does not flow out of the cylinder in a state where the hydraulic-fluid supply coupler is not connected.

In order to grip the workpiece by driving a clamping member, this first aspect is configured to connect the hydraulic-fluid supply coupler provided at the distal-end portion of the robot arm to the hydraulic-fluid supply port of the cylinder that drives the clamping member, and hence the workpiece can be gripped with the clamping member in the moving range of the distal-end portion of the robot arm. For this reason, this aspect is not subject to a constraint in that the clamping device needs to be moved to a predetermined position in order to grip the workpiece, and also no need to provide a dedicated device for gripping the workpiece with the clamping device.

In the above-described aspect, the machine tool may include a palette changing mechanism for arranging a plurality of the clamping devices one by one at a machining position of the machine tool, and it is preferable that the robot arm is configured to connect the hydraulic-fluid supply coupler to the hydraulic-fluid supply port of the cylinder of the clamping devices that are not arranged at the machining position.

With this configuration, the cycle time for machining can be reduced, compared with a case where the clamping device grips the workpiece at the machining position.

In the above-described aspect, when the workpiece held with the workpiece holding section is disposed by the robot arm at a position where the workpiece can be clamped with the plurality of clamping members, it is preferable that the hydraulic-fluid supply coupler is configured to be connected to the hydraulic-fluid supply port.

With this configuration, it is possible to perform a step of disposing the workpiece held with the workpiece holding section at a position where the workpiece can be gripped with the clamping members and a step of gripping the workpiece with the clamping members at the same time or substantially at the same time, and is advantageous in shortening the cycle time of machining.

In the above-described aspect, it is preferable to further include a coupler-position changing means for changing a position of the hydraulic-fluid supply coupler relative to the distal-end portion of the robot arm.

With this configuration, for a plurality of types of clamping devices having different distances between the position at which the workpiece is gripped with the clamping members and the hydraulic-fluid supply port, it is possible to perform a step of disposing the workpiece held with the workpiece holding section at a position where the workpiece can be gripped with the each clamping members and a step of gripping the workpiece with the each clamping members at the same time or substantially at the same time In the above-described aspect, it is preferable that the workpiece holding section is configured to hold the workpiece as a result of being driven by the hydraulic fluid supplied from the hydraulic-fluid supply means.

With this configuration, it is possible to supply the hydraulic-fluid supply coupler and the workpiece holding section with a hydraulic fluid by using a single hydraulic-fluid supply means, and is advantageous in suppressing an increase in the number of constituent components.

According to the above-described aspects, it is possible not only to prevent an increase in the number of constituent components in the machine tool and its peripheral equipment but also to reduce the cycle time for machining.

REFERENCE SIGNS LIST

10 Frame
20 Main shaft
30 Tool
40 Clamping device
41 First clamping member
42 Second clamping member 43 Cylinder
43b Hydraulic-fluid supply port
50 Robot
60 Robot arm
65 Distal-end portion
65b Holding section
65c Hydraulic-fluid supply coupler
70 Hydraulic-fluid supply device
71 First valve
72 Second valve
80 Robot control unit
81 Memory device

The invention claimed is:

1. A workpiece clamp apparatus comprising:
   a robot arm having claws for holding a workpiece at a distal-end portion of the robot arm;
   a hydraulic-fluid supply coupler provided at the distal-end portion of the robot arm;
   a compressor which supplies hydraulic fluid to the hydraulic-fluid supply coupler;
   a clamping device having a plurality of clamping members that grip the workpiece for machining with a machine tool;
   a cylinder that is provided on the clamping device, that has a hydraulic-fluid supply port to which the hydraulic-fluid supply coupler can be connected, and that drives at least one of the plurality of clamping members in a direction as a result of the hydraulic fluid being supplied via the hydraulic-fluid supply port;
   wherein the robot arm is configured to move the distal-end portion of the robot arm in a predetermined direction to reduce a distance between the distal-end portion of the robot arm and the clamping device in order to locate the workpiece held by the claws at a position where the workpiece can be gripped by the plurality of clamping members;
   wherein the hydraulic-fluid supply coupler of the robot arm is configured to connect with the hydraulic-fluid supply port when the robot arm locates the workpiece at the position where the workpiece can be gripped by the plurality of clamping members;
   the hydraulic-fluid supply port is configured such that the hydraulic fluid does not flow out of the cylinder in a state where the hydraulic-fluid supply coupler is not connected;
   the hydraulic-fluid supply port is further configured such that the hydraulic fluid in the cylinder is discharged in a state in which the hydraulic-fluid supply coupler is connected to the hydraulic-fluid supply port and the compressor does not supply the hydraulic fluid to the hydraulic-fluid supply coupler; and
   the workpiece clamp apparatus further comprises a linear guide which extends in a perpendicular direction perpendicular to the predetermined direction and is capable of changing a position of the hydraulic-fluid supply coupler relative to the distal-end portion of the robot arm in the perpendicular direction.

2. The workpiece clamp apparatus according to claim 1, wherein, when the workpiece held with the claws is disposed by the robot arm at a position where the workpiece is clamped with the plurality of clamping members, the hydraulic-fluid supply coupler is connected to the hydraulic-fluid supply port.

3. The workpiece clamp apparatus according to claim 1, wherein the claws are driven by the hydraulic fluid supplied from the compressor to hold the workpiece.

* * * * *